L. B. BALL.
Horse Rake.
No. 69,610.	Patented Oct. 8, 1867.
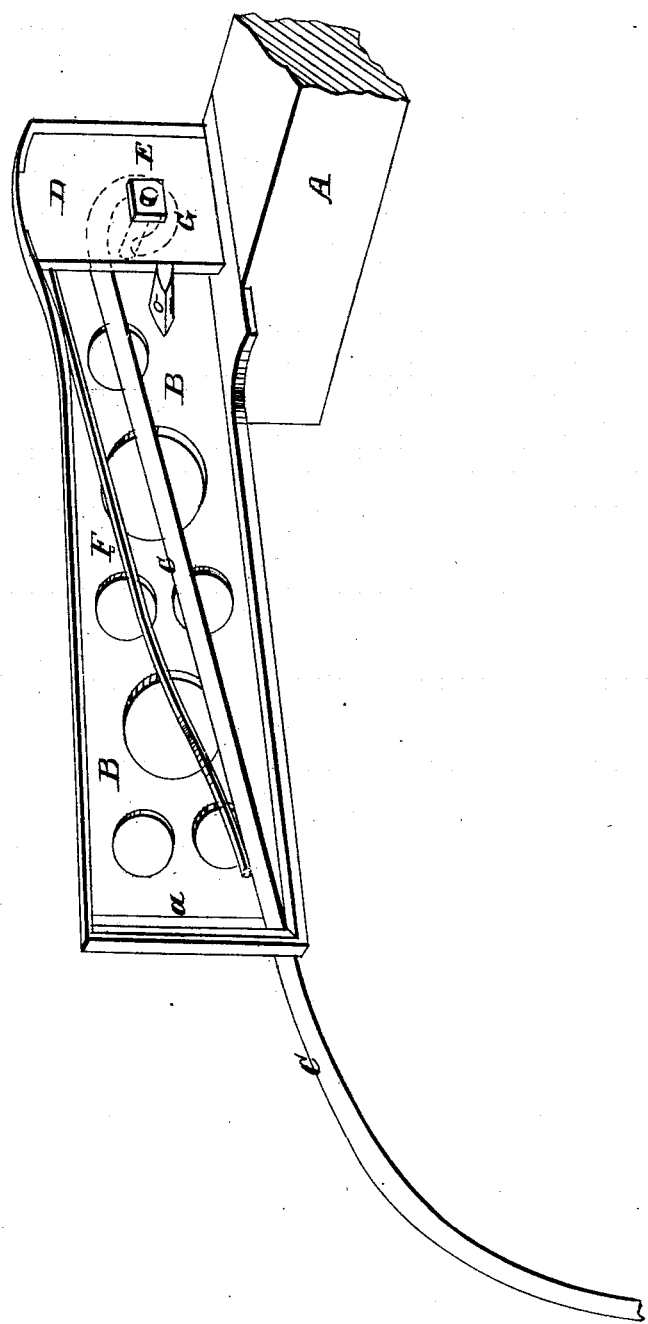

United States Patent Office.

LEVI B. BALL, OF DAYTON, OHIO.

Letters Patent No. 69,610, dated October 8, 1867.

IMPROVEMENT IN HORSE-RAKES.

The Schedule referred to in these Letters Patent and making part of the same.

TO ALL WHOM IT MAY CONCERN:

Be it known that I, LEVI B. BALL, of Dayton, in the county of Montgomery, and in the State of Ohio, have invented certain new and useful improvements in the Device used for Attaching Teeth to Hay-Rakes; and I do hereby declare that the following is a full, clear, and exact description thereof, reference being had to the accompanying drawings, forming a part of this specification.

The drawing is a perspective view, showing my improvement attached to the rocking-bar of a horse-rake.

My invention consists in an improved mode of applying a spring to the teeth of horse-rakes, and of securing the spring and tooth to the rock-bar.

A represents the rock-bar. B is a cast-iron "housing," provided with an opening, a, at its forward end, as a guiding-slot for the tooth C, and fitted at its other end with a suitable stud, o, and recess to receive the plate D. The inner end of the housing B is suitably fixed, by bolting, or otherwise, to the rock-bar. The inner end of tooth C has an eye formed on it, through which the bolt E passes. F is a spring, having one end suitably held in the housing, and the other end pressing down upon the tooth. When the tooth is put in its place, the bolt is put through it and through the plate D; the nut G then draws the housing B, tooth C, and plate D, all tight together, thus holding the tooth and spring in the desired position, and preventing any lateral motion.

What I claim as new, and desire to secure by Letters Patent, is—

The housing B, constructed and operating as described, in combination with spring F, tooth C, plate D, bolt E, and nut G, substantially as and for the purposes set forth.

In testimony that I claim the above-described invention I have hereunto signed my name this    day of February, 1867.

LEVI B. BALL.

Witnesses:
   JOS. HAMMON,
   THOS. D. MITCHELL.